United States Patent
Nguyen et al.

(10) Patent No.: US 9,189,020 B2
(45) Date of Patent: Nov. 17, 2015

(54) PORTABLE COMPUTING DEVICE WITH COVER PROVIDING ACCESS AND CONTROL OF APPLICATIONS

(75) Inventors: Nguyen Nguyen, San Jose, CA (US); Mak Vaziri, San Jose, CA (US); Saeed Seyed, Los Altos, CA (US); Kenneth S. Mak, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 840 days.

(21) Appl. No.: 13/422,395

(22) Filed: Mar. 16, 2012

(65) Prior Publication Data

US 2013/0242505 A1    Sep. 19, 2013

(51) Int. Cl.
*G06F 1/16* (2006.01)
*G06F 3/0481* (2013.01)
*G06F 3/0488* (2013.01)

(52) U.S. Cl.
CPC ............ *G06F 1/1626* (2013.01); *G06F 1/1632* (2013.01); *G06F 3/0481* (2013.01); *G06F 3/04886* (2013.01); *G06F 2200/1633* (2013.01); *G06F 2200/1634* (2013.01); *Y10T 29/49826* (2015.01)

(58) Field of Classification Search
CPC . G06F 1/1632; G06F 1/1626; G06F 3/04886; G06F 3/0481
USPC .................... 361/679.3, 0.26, 0.56, 0.03, 0.02
See application file for complete search history.

(56) References Cited

U.S. PATENT DOCUMENTS

| | | | |
|---|---|---|---|
| 6,882,524 B2 | 4/2005 | Ulla et al. | |
| 7,025,274 B2 | 4/2006 | Solomon et al. | |
| 7,907,394 B2 * | 3/2011 | Richardson et al. | 361/679.3 |
| 7,980,898 B2 * | 7/2011 | Chatterjee | 439/660 |
| 8,072,423 B2 * | 12/2011 | Rolus Borgward | 345/157 |
| 2002/0099895 A1 * | 7/2002 | Landron et al. | 710/303 |
| 2005/0200608 A1 | 9/2005 | Ulla et al. | |
| 2005/0286212 A1 * | 12/2005 | Brignone et al. | 361/679 |
| 2006/0279924 A1 * | 12/2006 | Richardson et al. | 361/683 |
| 2007/0004450 A1 * | 1/2007 | Parikh | 455/556.1 |
| 2008/0284745 A1 * | 11/2008 | Kao et al. | 345/173 |
| 2012/0057288 A1 | 3/2012 | Chou et al. | |
| 2013/0077235 A1 * | 3/2013 | Pawar et al. | 361/679.56 |
| 2014/0146455 A1 * | 5/2014 | Abdelsamie et al. | 361/679.02 |

* cited by examiner

*Primary Examiner* — Zachary M Pape
*Assistant Examiner* — Douglas Burtner
(74) *Attorney, Agent, or Firm* — Edell, Shapiro & Finnan, LLC (57) ABSTRACT

A protective cover is utilized with a portable computing device, where the portable computing device includes a front surface that includes a display. The protective cover includes a sheet including a front surface and a rear surface, where the sheet has a suitable dimension to cover at least the display of the computing device when the protective cover is connected with the computing device. The sheet further includes a cut-out section that facilitates viewing of a reduced area of the display when the protective cover is connected with the computing device. The protective cover further includes at least one electrically conductive contact member located on the rear surface and configured to engage with at least one contact member of the computing device when the protective cover is connected with the front surface of the computing device.

20 Claims, 7 Drawing Sheets

PORTABLE COMPUTING DEVICE WITH COVER PROVIDING ACCESS AND CONTROL OF APPLICATIONS

TECHNICAL FIELD

The present disclosure relates to portable computing devices and expanded usage of such devices.

BACKGROUND

Portable computing devices, such as laptops, tablets, personal digital assistant (PDA) devices, etc., can become damaged (e.g., during transit) if not properly protected. Protection covers are typically provided to protect components of portable computing devices (e.g., the display screen, input keypads and mouse pads, etc.) from various types of damage (such as liquid spills and contact with other objects).

While protective covers are valuable and often an essential component for portable computing devices, they also limit the use of such devices when engaged with a device in a closed configuration. For example, certain types of portable computing devices, such as tablets, are implemented for use with covers and are further designed to sense when a cover overlays the display, keyboard and/or other components of the device, such that the computing device turns off or implements a "sleep" mode (e.g., to conserve on battery power for the device) since the device is basically inoperable when the protective cover engages with the device.

DESCRIPTION OF EXAMPLE EMBODIMENTS

Overview

A protective cover is utilized with a portable computing device, where the portable computing device includes a front surface that includes a display. The protective cover comprises a sheet including a front surface and a rear surface, where the sheet has a suitable dimension to cover at least the display of the computing device when the protective cover is connected with the computing device. The sheet further includes a cut-out section that facilitates viewing of a reduced area of the display when the protective cover is connected with the computing device. The protective cover further comprises at least one electrically conductive contact member located on the rear surface of the sheet that is configured to engage with at least one contact member of the computing device when the protective cover is connected with the front surface of the computing device.

The computing device can further include at least one application that is associated with the protective cover, where a processor of the computing device is configured with logic to execute and control operations of the at least one application so as to identify when the protective cover is engaged with the front surface of the computing device based upon sensing a contact between the at least one contact member of the computing device and the at least one contact member of the protective cover.

Example Embodiments

Figure 1:
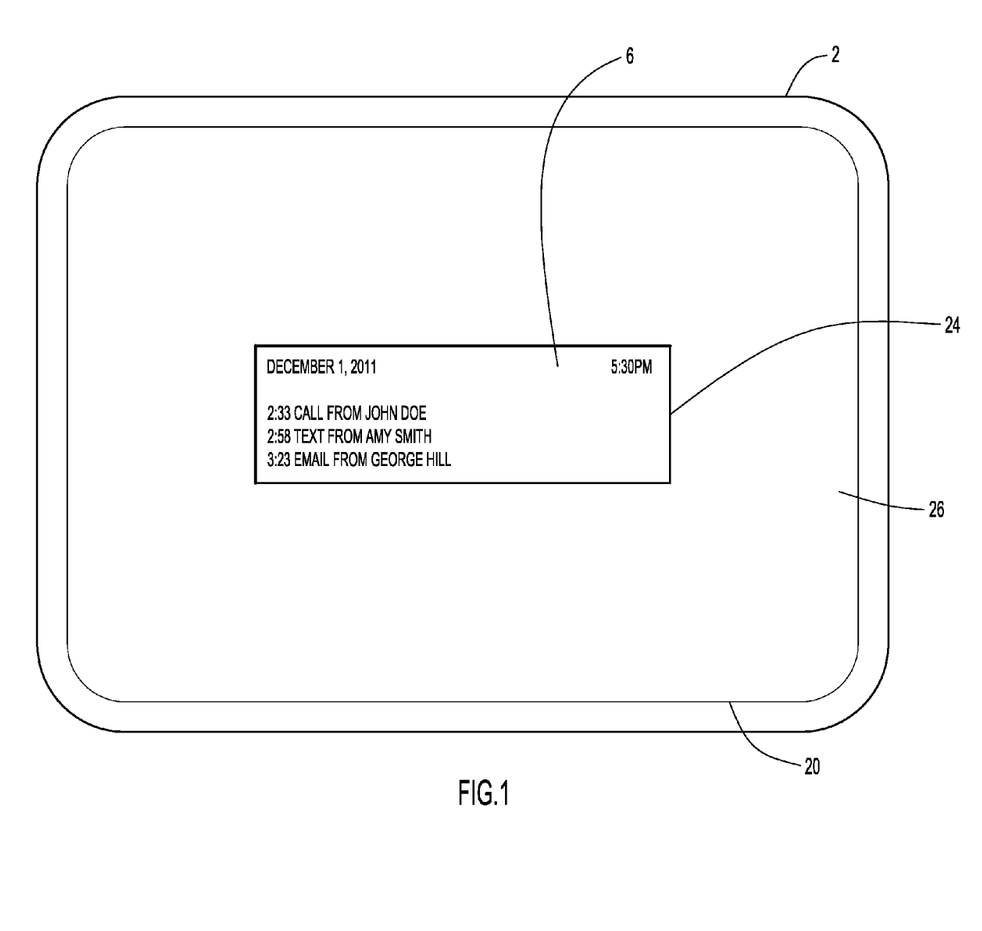
FIG. 1 is a top view in plan of a computing device with protective cover connected with the computing device including a portion of the cover that facilitates viewing of the display of the computing device.
Figure 2:
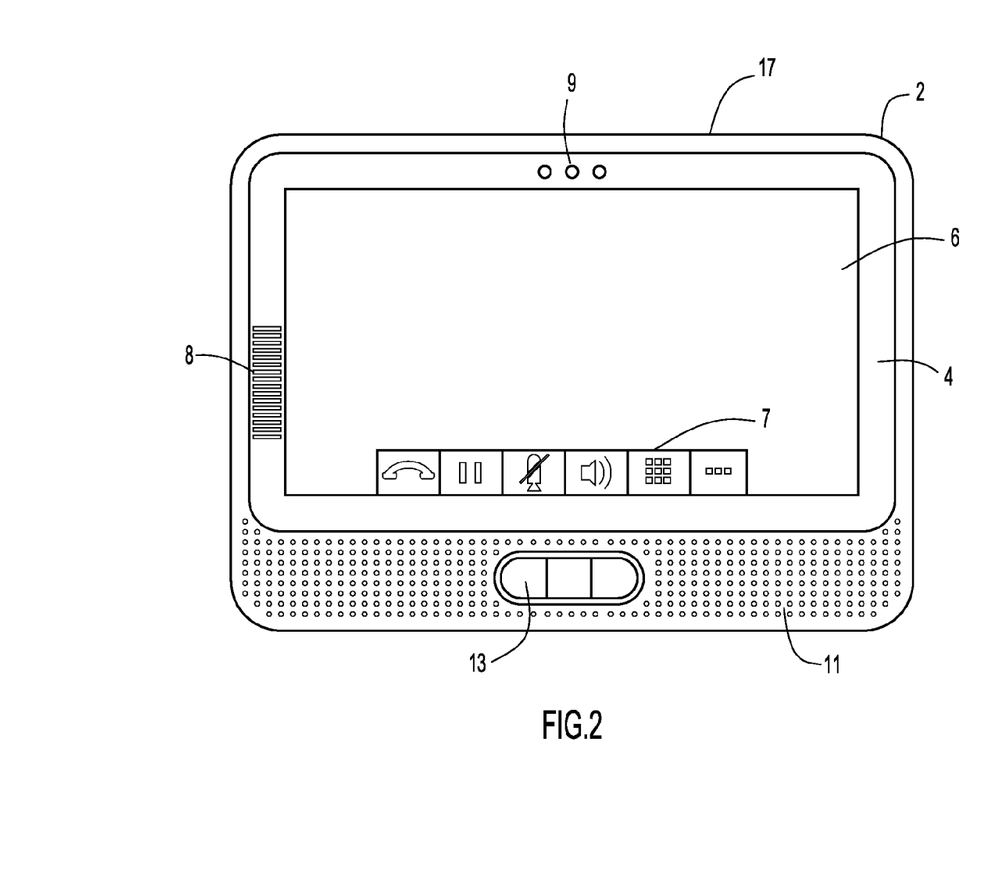
FIG. 2 is a top view in plan of the front surface of the computing device with display and with the protective cover removed from the computing device.

Referring to FIGS. 1-4, a computing device 2 includes a protective cover 20 that fits over a front surface of the device 2 to protect the display as well as other components of the device (e.g., camera, one or more microphones and speakers, etc.) that may be included with the computing device. The computing device 2 is a portable type of computing device that includes a display screen 6 on its front surface 4 (e.g., an LCD display). The front surface 4 can also include a keyboard, a mouse pad, a camera, one or more speakers and/or any other input or output peripheral components that are integrated with the computing device. The display screen 6 can also include touch screen to facilitate interaction and input of information to the computing device by a user (e.g., by touching a stylus or one's finger to the screen), where the touch screen serves to provide a keyboard, mouse pad or other interactive control functions that can be input by the user to the computing device (e.g., a touchscreen display of a keyboard to allow a user to input key stroke data, or providing interactive icons 7 as shown in FIG. 2 to establish user control of certain features of the computing device 2, such as speaker volume, pausing video content, etc.). Examples of portable computing devices having such features include, without limitation, tablets such as the Cisco Cius (Cisco Systems), the iPad (Apple), Kindle Fire (Amazon Digital Services), Nook tablet (Barnes and Noble), etc.

The protective cover 20 includes a relatively thin and lightweight sheet of material (e.g., a single layer or multi-layered sheet of material) that is configured to fit over the front surface 4 (or a substantial portion thereof) of the computing device 2 so as to protect the display 6 and any other components of the device 2 from potential damage during transport (such as contact with moisture or hard surfaces). The cover 20 can be constructed of any suitable lightweight and durable materials such as rigid metal, plastic or other suitable synthetic materials, where the cover can further be designed to be water resistant or water impermeable. The cover 20 can have a geometric configuration that is generally rectangular or is similar to the shape and dimensions of the front surface of the portable computing device to which it is designed to connect with, such that the cover encompasses the entire area or a majority of the area of the front surface (including at least the display) of the computing device.

Figure 3:
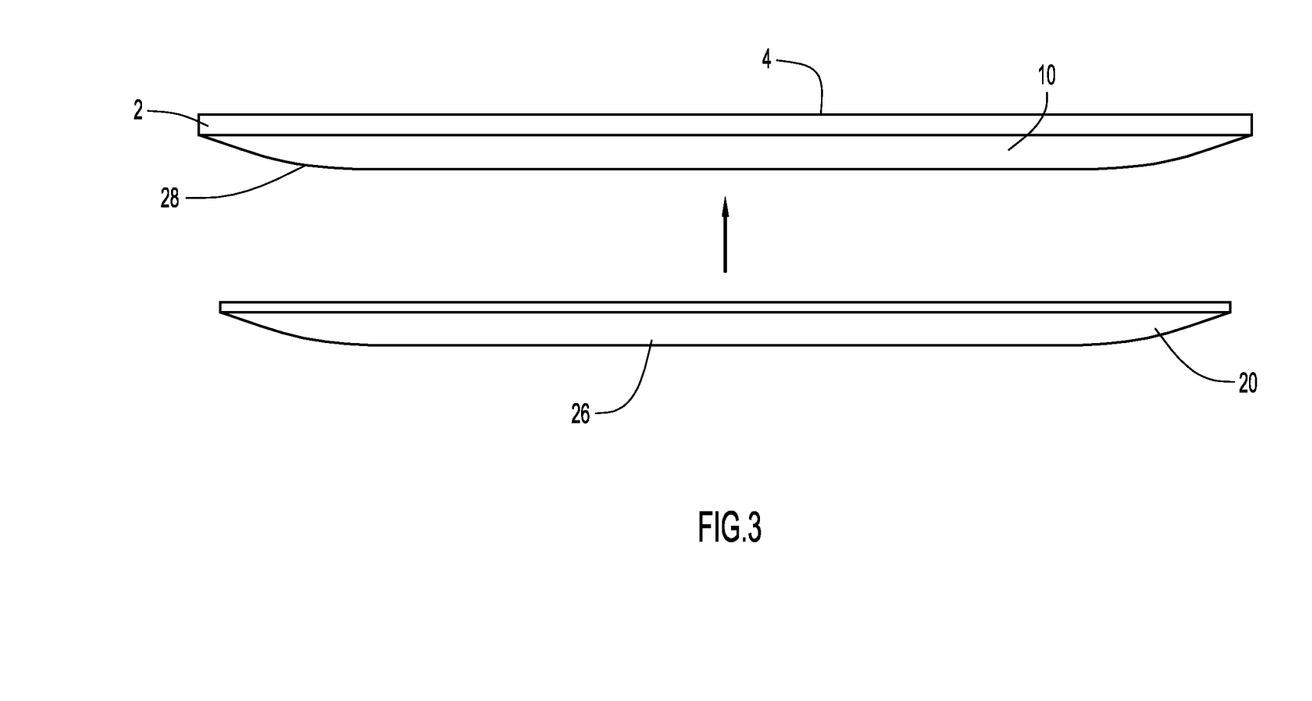
FIG. 3 is an exploded view in perspective of the computing device and protective cover of FIG. 1, where the cover is shown in a configuration in which the cover affixes to a rear surface of the computing device.
Figure 4:
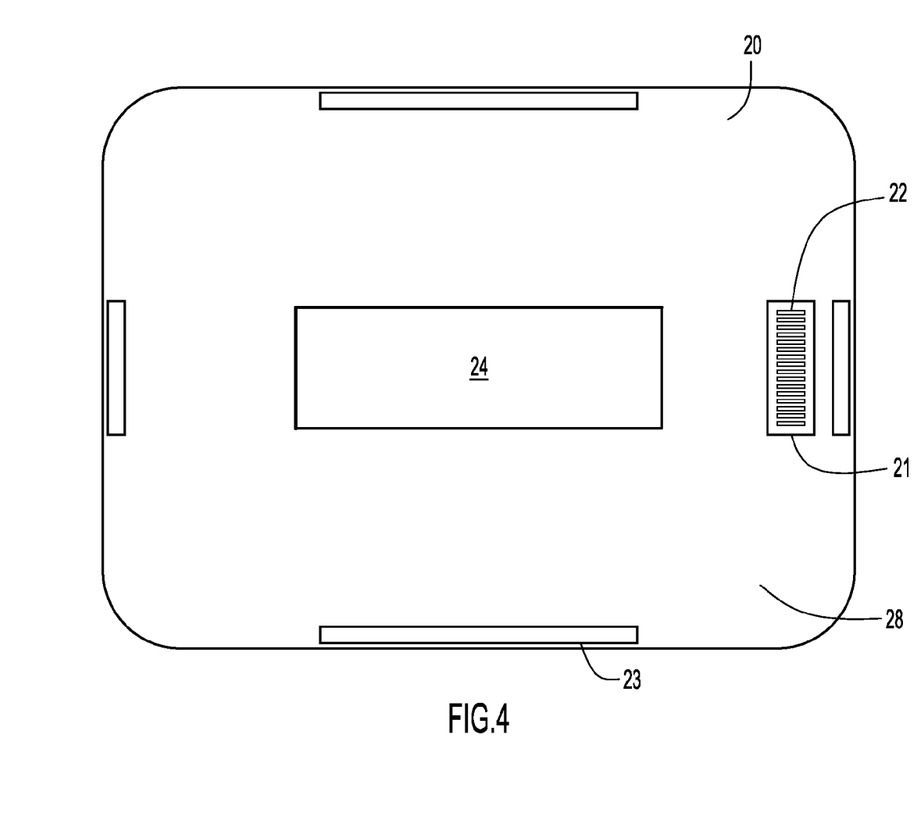
FIG. 4 is a view of the rear side of the protective cover of FIG. 1.

In the example embodiments depicted in the figures, the cover 20 is configured to be completely separated from the computing device 2 (e.g., to facilitate removal of the cover and placement on the underside or rear surface 10 of the device 2 as shown in FIG. 3). However, other embodiments are also possible in which the cover remains affixed to the computing device and connects along one or more edge portions of the device (e.g., via a hinged connection to facilitate opening and closing of the cover over the front surface of the device). The cover 20 further includes one or more suitable contact members 22 disposed at any one or more suitable locations (e.g., at any one or more locations along the outer or peripheral areas of the front surface 4 of the cover 20 as shown in FIG. 4 and as described in further detail herein) that engage with one or more corresponding contact member portions 8 disposed on the front surface 4 and/or other portions of the computing device 2 when the cover 2 is placed over the front surface 4 and connects with the computing device 2. Engaging of the contact members 22 of the cover 20 with the corresponding contact member portion(s) 8 of the computing device 2 provides a sensing indication or detection feature for the computing device that the cover is disposed over the display screen (e.g., so as to implement a non-use/limited use/sleep mode for the computing device as well as enable one or more applications for use by the computing device when in this operational mode).

As further depicted in the figures, the cover 20 can be sufficiently rigid along a substantial portion of the cover 20 so as to ensure suitable protection for the front surface 4 of the device 2 while also having slight flexibility or deformability at certain portions (e.g., along the cover peripheral edge portions) to facilitate connection of the cover with the computing device (e.g., to facilitate a connection in which edge portions of the cover coming into contact with and/or extending partially around corresponding edge portions of the computing device can slightly flex to provide a removable, snap tight fitting and/or magnetic locking connection between cover and computing device). Alternatively, the cover can be configured to be bendable or foldable along one or more fold lines that extend across a dimension of the cover (e.g., to allow the cover to fold up into different configurations when not engaged to protect the front surface of the computing device).

As depicted in FIG. 1, the protective cover 20 includes a cut-out section 24 that provides a visible or viewable window to a portion of the display screen 6 that underlies the cut-out section 24 when the cover 20 is attached to the computing device 2. The cut-out section 24 can simply be a removed and open portion of the cover 20 that exposes the portion of the display screen 6 of the device 2 underlying the cut-out section. Alternatively, the cut-out section 24 can include a material having a sufficient transparency that facilitates viewing of the underlying portion of the display screen 6 through the transparent material, such that the cover 2 provides a protective barrier for the entire display screen while allowing visibility at the cut-out section 24. As described in further detail herein, the protective cover 2 provides protection for the front surface 4 of the computing device 2 while also providing a smaller display user interface through the cut-out section 24 for use by certain applications of the computing device that are enabled or activated while the cover is connected with the device.

When the cover 2 is not connected with the front surface 4 of the computing device 2 (e.g., during use of the device), the cover can be configured to be fit underneath the device to engage with its rear surface 10. As depicted in FIG. 3, the cover 2 has a configuration that resembles the contour of the rear surface 10 of the computing device 2 so as to facilitate connection of the cover with the device rear surface. In particular, the cover 20 includes a front surface 26 that remains exposed and faces away from the computing device 2 when the cover is connected with both front and rear surfaces 4, 10 of the device 2 and a rear surface 28 that at least partially engages with the rear surface 10 of the device 2 when the cover 2 is connected with the device rear surface 10. In the example embodiment, and as best represented by the view shown in FIG. 3, the contour of the rear surface 28 is slightly curved at or near the peripheral edges of the cover 20 such that the rear surface 28 has a slightly concave configuration. This allows the cover 20 to fit snugly over the rear surface 10 of the device 2, e.g., in a snap tight connection that allows for easy connection and removal of the cover from the device rear surface. When connected with the rear surface 10 of the device 2, the cover 20 can provide further support for the device 2 (e.g., when the device 2 rests on the lap of the user).

An example embodiment is depicted in FIG. 4 of contact members 22 disposed on a contact surface or pad 21 located near a side edge of the rear surface 28 of the cover 20. The contact members 22 comprise electrically conductive pads or pins (e.g., pads or pins made of a suitable electrically conductive material, such as a conductive metal material, that can optionally be spring biased outwardly from the pad 21) that are suitably dimensioned and aligned along the contact pad 21 of the cover 20 so as to engage with one or more contact member(s) 8 disposed along one or more peripheral portions of the front surface 4 of the computing device 2 (e.g., contact members 8 disposed at a side peripheral area of front surface 4 of the device 2 as depicted in FIG. 2). Alternatively, the contact members 22 can be provided directly on the rear surface 28 of the cover 20 (without any contact pad provided there between). The engagement of one or more contact members 22 of the cover 20 with the contact member(s) 8 of the device provides an indication to the device that the cover has been engaged with the device. In particular, the computing device 2 senses or detects when the cover 20 is connected at its front surface 4 based upon the electrical connections between contact member(s) 22 of the cover 20 and its corresponding contact member(s) 8. In addition, depending upon the number and/or placement of contact members 22 on the cover, the contact members 22 engage with different contact member(s) 8 and/or at different contact member locations along the front surface 4 of the device 2. This facilitates a configuration of different cover designs (e.g., covers having different contact member configurations) that can be detected by the computing device 2 (based upon a particular or specific pattern of conductive contact locations that are detected by the contact member(s) 8 of the device 2) for different types of use applications as further described herein.

The rear surface 28 of the cover 20 can also include one or more magnetically attracting strips (e.g., constructed of a magnetic ferrous material or any other suitably material that is magnetically attracted to another material, such as the strips 23 shown along the outer peripheral area portions along of the rear surface 28 in the example embodiment of FIG. 4) that are configured and suitably dimensioned to align and magnetically attract with one or more corresponding engagement strips disposed along peripheral portions of the front surface 4 of the device 2 (e.g., a peripheral border 17 extending around an outer area of the front surface 4 of the device as depicted in FIG. 2) in order to facilitate affixing the cover 20 to the front surface 4 of the device 2. In addition, the cover can further be configured to secure its connection with the device by peripheral side and/or edge portions of the cover frictionally engaging with and extending at least partially around the peripheral edges of the front surface 4 of the device 2 to releasably secure both together in a snap tight fitting connection.

Figure 5:
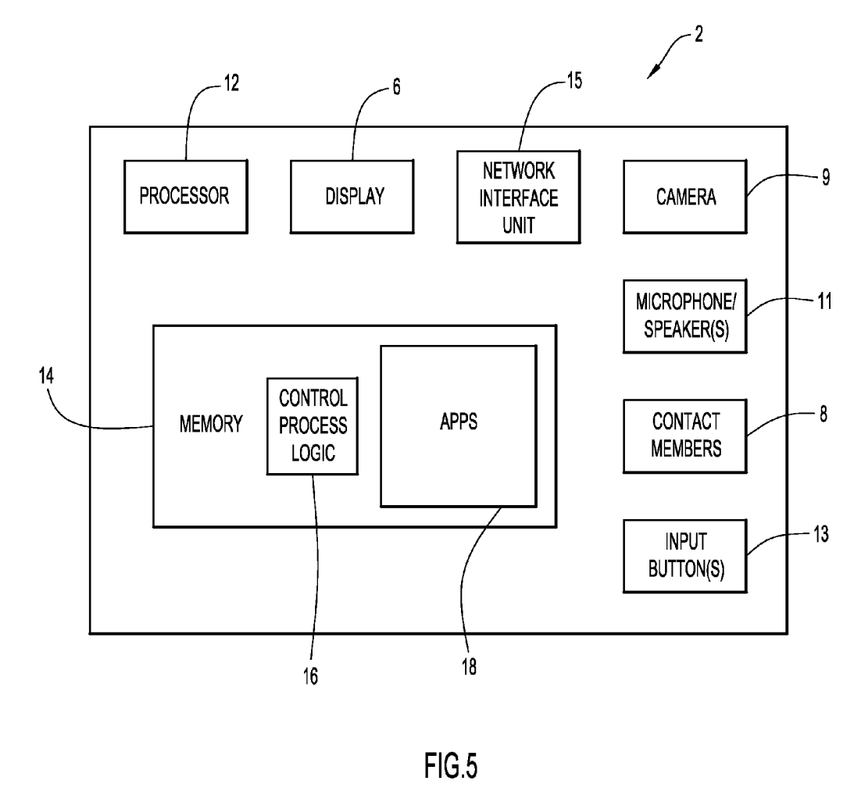
FIG. 5 is a schematic block diagram of example components for the computing device of FIG. 1.

An example embodiment of a computing device to be used with the cover is depicted in FIGS. 2 and 5. In addition to the display 6, the computing device 2 includes a processor 12 and memory 14. The computing device can further include other components including, without limitation, a camera 9, audio input and output components 11 (e.g., microphone and one or more speakers), one or more input/control buttons or keys 13

(e.g., power button, and one or more other control buttons), and a suitable network interface unit 15 that facilitates connection between the computing device and one or more other computing devices (e.g., an Internet Protocol (IP) network, such as an intranet network or over the internet). The processor 12 can comprise a microprocessor that executes control process logic instructions 16 stored within memory 14, where the control process logic instructions include operational instructions and software applications stored within memory 14, including an Apps module 18 that includes one or more software applications for use when the cover 20 is connected with the device 2.

The software applications in the Apps module 18 stored in memory 14 include applications having computer readable instructions that are implemented by the processor 12 of the computing device 2 to display content on display 6 as well as perform other operations associated with the applications. In particular, the Apps module 18 includes a detection application that facilitates detection of when (and what type of) cover 20 is connected with device 2 (via electrical contact between contact members 22 of the cover 20 and contact member(s) 8 of the device 2). The processor 12 performs operations in accordance with the steps set forth in the flow chart of FIG. 7. The memory 14 can comprise read only memory (ROM), random access memory (RAM), magnetic disk storage media devices, optical storage media devices, flash memory devices, electrical, optical, or other physical/tangible memory storage devices, and any combinations thereof. In addition, the computing device 2 can utilize any suitable operating system (e.g., Android, Windows, Mac OS, etc.) to facilitate operation and use of the applications by the computing device as well as interaction of the computing device with one or more other computing devices (e.g., over a network).

The software applications that are stored within the Apps module 18 of the computing device's memory 14 can be obtained by the computing device 2 in any suitable manner. For example, certain software applications that are specific to a cover 20 can be stored in any suitable memory device (e.g., an optical storage media device such as a CD, a flash memory device, or any other suitable memory storage device) that is provided along with the cover 20 at a point of purchase for a consumer, where the computing device 2 can load such software applications into memory 14 for use with the cover 20. Alternatively, specific software applications can be accessible by the computing device 2 for downloading and storage within memory 14 from a distant or other memory storage device (e.g., accessible from a server or other computing device) over a network (e.g., intranet or internet, or direct access from another computing device).

When the cover 20 is connected with the computing device 2 such that the contact members 22 engage with contact member(s) 8, the computing device 2 senses or detects that the cover is connected, which allows the computing device to go into a non-use or sleep type mode. In this mode, the computing device can conserve energy/battery usage, since the functions of the computing device are limited (due to at least a portion of the display 6 and also other components of the device 2 being covered). However, the computing device 2 can further utilize one or more software applications from the Apps module 18 which run applications that are displayed in a portion of the display 6 that corresponds with the cut-out section 24 of the cover 20. When a particular cover 20 is being used for a first time with the device 2 (e.g., the device 2 detects a specific cover 20 for the first time), a software application of the device 2 (e.g., stored within the Apps module 18) can display a prompt that is visible through the cut-out section 24 of the cover 20 requesting a user of the device 2 to install one or more software applications within memory 14 (e.g., downloading the software from a website, or installing software that may have been provided with the cover) that are associated with using the cover.

As previously noted, the cover 20 can have different contact member configurations that conductively engage with the contact member(s) of the device 2. The pattern or location of the contact members 22 of the cover 20 can be detected by the computing device 2 to provide a specific identification of the cover 20 to the device 2, which allows the computing device 2 to identify the precise location and area that the cut-out section 24 of the cover 20 aligns with the display 6 and also the types of software applications from the Apps module 18 that are applicable to the specific cover. While the cut-out section 24 is shown in the example embodiment of the figures as being approximately centrally located along the front surface 26 of the cover 20, it is noted that the cut-out section for a cover can be provided at any number of different locations, with the area of the cut-out section also being a number of different sizes. The computing device 2 can identify the location and size/area of the cut-out section 24 based upon the location(s) and/or number of contact members 22 for the cover 20 that are sensed or detected by the device 2 via the electrically conductive contact with the contact member(s) 8 of the device 2.

A number of different covers 20 can also be configured for use with different software applications of the Apps module 18, where the computing device 2 identifies which types of software applications from its Apps module 18 can be utilized for a particular cover 20 that has been identified (based upon the location/number of contact members 22 of the cover 20 that are sensed or detected by the device 2). The computing device 2 can be configured to conductively engage with any selected number of contact members of a cover. In an example embodiment, a computing device can include sixteen or more contact members 8 in the form of contact pads or pins (e.g., from about twenty to about 30 or more contact pads or pins) that are configured to engage with the same or fewer contact members 22 of a cover 20 (thus establishing electrical contact points with each contact member 22). As shown in the example embodiments, the contact members 22 of the cover 20 and the contact members 8 of the device 2 are closely aligned so as to be provided in a relatively small area. However, the contact members can have any other suitable configuration and be disposed at any number of locations on cover and front surface of the device.

In touch screen configurations for the computing device 2, the reduced display area corresponding with the cut-out section 24 of the cover 20 can still operate as a touch screen, allowing a user to interact with software applications from the Apps module 18 by touching the display 6 within the cut-out section area. In other example embodiments, certain covers can be configured to include touch screen or "touch" areas on the cover that allow a user to interact with the computing device 2 by touching a designated portion or area on the front surface 26 of the cover 20. The "touch" area(s) can be identified by suitable indicia printed on the cover front surface (e.g., indicia representing functional buttons).

Figure 6:
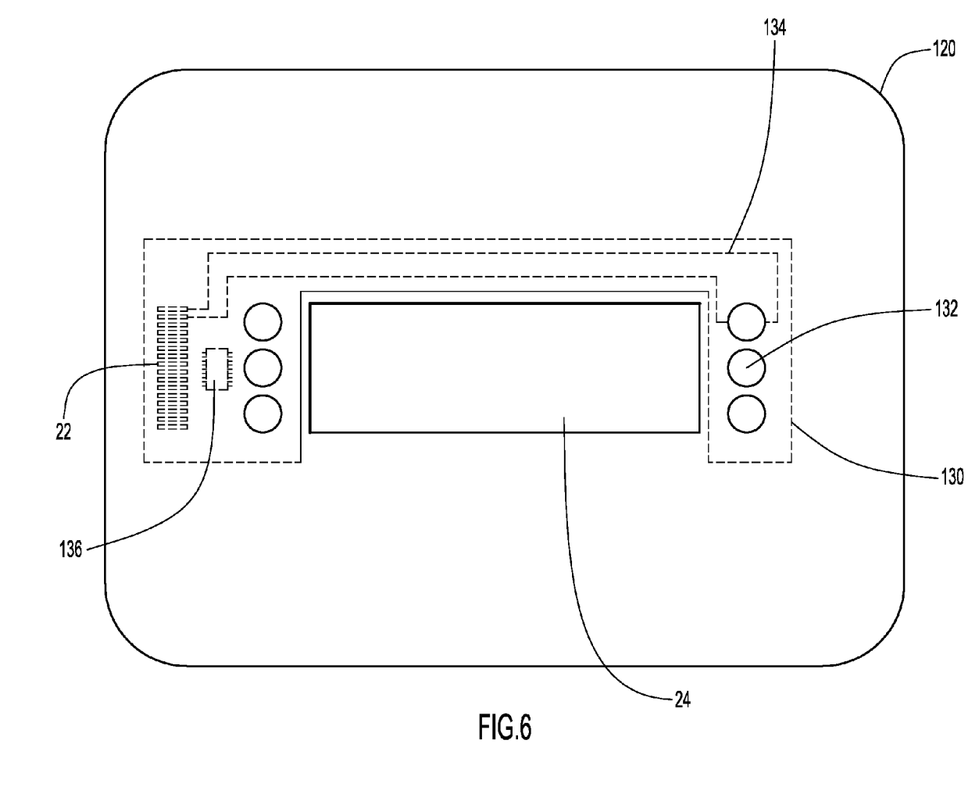
FIG. 6 is a schematic view in partial section of another example embodiment of a cover with touch pad features.

In an example embodiment, a cover 20 can be designed to include capacitive touch sensors (similar in configuration to capacitive sensors for touch screen displays of computing devices) that can be electrically connected to one or more contact members 22 of the cover 20. A printed circuit can be embedded within the cover to provide electrical pathways between the touch screen area on the cover and the contact members 22. An example embodiment is depicted in FIG. 6, in which a cover 120 includes a cut-out section 24, contact members 22, and a plurality of interactive touch buttons 132 that are in contact with capacitive sensors such that pressing upon the buttons 132 by the user registers a measurable input signal by their corresponding capacitive sensors. The conductive wiring 134 and other features of the printed circuit are shown in dashed lines to represent that the printed circuit is embedded within (and thus not visible on the outer surface of) the cover 20.

Any selected number of buttons 132 (e.g., one or more) can be provided at any suitable locations in the areas defined between the cut-out section 24 and the peripheral edges along the front surface of the cover 120. There is no physical actuation required for the buttons 132. Instead, a simple touch by the user upon the location of the front surface of the cover 120 identified by the buttons 132 registers an input (i.e., a sense of the touch) by the capacitive sensors underlying the buttons. The locations of the buttons 132 can simply be icons, text and/or other indicia printed upon the front surface of the cover 120 (e.g., by silk screening on the cover, embossed indicia on the cover and/or recessed locations on the top surface of the cover).

A schematic diagram of a circuit 130 is also depicted in FIG. 6, in which conductive lines 134 connect the capacitive sensors associated with buttons 132 with one or more corresponding contact members 22. For simplicity purposes, only one button 132 is shown connected via conductive lines 134 to contact members 22. However, it is noted that each button 132 includes its own corresponding one or more conductive lines 134 that connect to corresponding contact members 22. The circuit 130 can further include a processor 136 that is also connected with the conductive lines 134 to process input signals by the capacitive sensors in response to touching of buttons 132 on the cover 120 by a user. The input signals resulting from user touch of buttons 132 are registered at the corresponding contact members 22, and the contact members 22 provide such signals to the corresponding engaging contact members 8 of the device 2, where such input signals can be used by the device 2 in combination with one or more specific software applications (stored, e.g., within Apps module 18) associated with the cover 120 to facilitate interaction of the user with the content being displayed by the device that is viewable through cut-out section 24. The processing circuit 130 and its components (with the exception of buttons 132) are formed within the cover (e.g., formed within a layer that underlies an outer layer forming the front surface of the cover) utilizing any suitable circuit board printing or other processing techniques.

In another example embodiment, a portion of the cover 20 can be in close proximity or contact with the underlying touch display screen 6 of the device 2, where pressure applied to the cover can be sensed by the underlying touch screen to provide interactive input by the user to the computing device 2 during use of one or more software applications that are displayed within the area corresponding with the cut-out section 24 of the cover 20 (in this scenario, the computing device 2, by identifying the cover 20, also identifies the portion of the display 6 that underlies the "touch" portions indicated by indicia on the front surface 26 of the cover 20).

Figure 7:
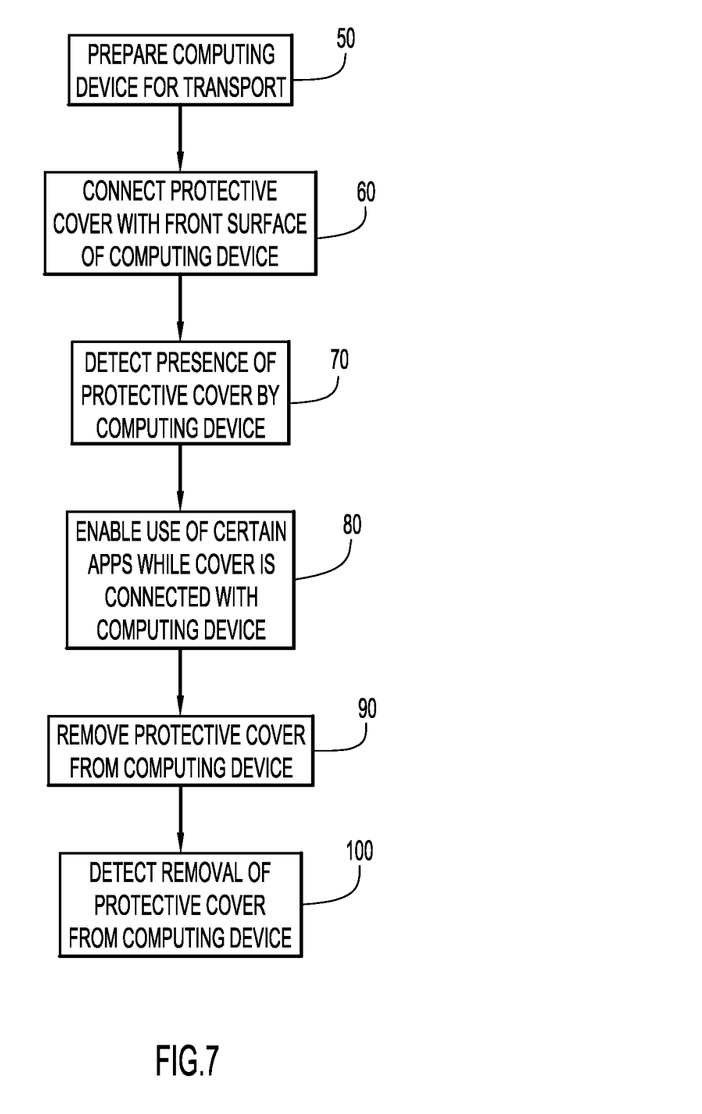
FIG. 7 is a flow chart depicting an example method of using the cover with the computing device of FIG. 1.

Operation of a cover with a computing device that further facilitates the use of certain software applications by the computing device is now described with reference to the flow chart of FIG. 7. At 50, a user decides to stop using his or her computing device 2 and prepares the device 2 for transport (e.g., the user closes out of and/or saves certain software applications that were in use). At 60, the user connects a cover 20 with the device 2 by engaging the cover 20 to the front surface 4 of the device 2. The cover 20 may have been stored beneath the device 2 in the manner as depicted in FIG. 3 (where the cover was connected to the rear surface 10 of the device 2) prior to being connected to cover the front surface 4. Connection of the cover 20 to the device 2 results in contact members 22 of the cover engaging contact member(s) 8 of the device. At 70, the computing device 2 detects that the cover 20 has been connected to the device 2 and, in certain scenarios, also identifies the type of cover 20 connected with the device 2. The computing device 2 can initiate a non-use or sleep mode (e.g., to conserve battery power). At 80, the computing device 2 further initiates or runs one or more software applications of its Apps module 18, resulting in a display of content in the area of the display 6 that corresponds with the cut-out section 24 of the cover 20 (e.g., the content that is displayed in the cut-out section 24 as shown in FIG. 1).

At 80, the computing device facilitates interactive use by the user of the one or more software applications (including applications of the Apps module 18) displayed within the display area of display 6 (as defined by cut-out section 24), where the user can touch the touch screen portion of display 6 that corresponds with the cut-out section 24 and/or touch other "touch" areas of the cover 20. As previously noted, the computing device 2 can include a software application (e.g., stored within memory 14) that recognizes when a specific cover 20 is connected for the first time with the device 2, where there may be specific software applications that are available for use with this specific cover 20. In this scenario, the device 2 can provide a display prompt viewable from the cut-out section 24 of the cover 20 that notifies the user that one or more software applications are available for installation and use with the device 2. In one example embodiment, the device 2 can prompt the user to download the software application(s) from a remote memory storage location (e.g., a server) at a particular website. In another example embodiment, the device 2 prompts the user to install the software application(s) utilizing a memory storage device that is provided with the cover 20 (e.g., a memory disk, flash drive, a CD-ROM, etc.).

When the user decides to activate the computing device 2 for facilitating complete functional operations of the device 2, the user removes the cover 20 at 90 from the device 2. This results in the device 2 detecting that the cover 20 has been removed at 100, and the device 2 re-activates itself (i.e., enables a full use mode). Alternatively, removal of the cover 20 does not activate the computing device 2 for full use, where the user instead must activate the device 2 in some other manner (e.g., by pressing a power button on the device 2, such as one of the buttons 13 depicted in FIG. 2).

Thus, the protective cover described herein provides protection for a computing device during non-use of many of its operating functions (e.g., during transport of the device) while allowing certain selected software applications to still be enabled for use with display and/or control of such applications within a smaller window of the computing device display that is defined by the cut-out section of the protective cover. Such software applications that can be used with the cover connected to the device may not be as complex as other types of applications but can still provide simple or basic information to the user while the cover is engaged with the device. For example, software applications associated with a cover can include, without limitation, applications that display and allow user access to emails, phone calls, text messages and/or any other incoming communications associated with an account of a user that is configured for interaction with the computing device 2 (e.g., incoming or recently received messages that are received at the user's account while the cover is engaged with the device), a scrolling display current news items (e.g., current stock prices, sports scores, major news headlines, etc., where the user can further touch the display screen or touch area of the cover to obtain further information associated with a particular news item), a display of the current date and time, a display of battery life for the computing device, a display providing video content (e.g., television programs or movies) or interactive video gaming features, etc.

In the example embodiment depicted in FIG. 1, an application from the Apps module 18 is utilized to display within the reduced area display window of the display 6 (defined as the portion underlying the cut-out section 24 of the cover 20) the following: current date and time information, and also different types of messages (e.g., email, phone call and text messages) associated with one or more other communication applications of the computing device 2 that have been sent to one or more accounts of the user while the cover 20 has been connected with the device 2. The application associated with the cover 20 that depicts such information can further include interactive features in which the user may touch on a portion of the reduced area display window or a touch area defined for the cover 20 to display further details about a particular message (e.g., the contents of an email or text message) within the reduced area display window. The application can also have further interactive features, e.g., the display of a menu bar that can be controlled by the user by touch in order to activate other features of the application and/or open and run any other applications stored within the Apps module 18 and associated with the cover 20.

Certain covers can be designed or configured for use with one or more specific software applications of the Apps module 18 for the computing device 2. For example, a gaming cover can be configured to enable the playing of certain video gaming applications by the device 2 within the smaller display area of display 6 that corresponds with the cover's cut-out section 24. The cover 20 can include one or more "touch" areas to facilitate interactive use by the user with the device 2 when playing a video game that is viewed through the cut-out section 24 of the cover. Other covers can be configured to enable other types of software applications to be initiated and operated by the device 2 when such covers are connected with the device 2. As previously noted, the software applications can be provided in a memory storage device provided with the cover 20 or available for downloading via a network (e.g., downloading applications specific to the cover 20 via iTunes software for use with an iPad). In addition, certain covers can include more than one cut-out section to include a plurality of reduced area display windows that are identified by a computing device in order to facilitate display of content in one or more of the windows when the cover is connected with the computing device.

The above description is intended by way of example only.

What is claimed is:

1. A protective cover for a portable computing device, the portable computing device including a front surface that includes a display, the protective cover comprising:
    a sheet including a front surface and a rear surface, wherein the sheet has a suitable dimension to cover at least the display of the computing device when the protective cover is connected with the computing device, the sheet further including a cut-out section that facilitates viewing of a reduced area of the display when the protective cover is connected with the computing device; and
    a plurality of electrically conductive contact members located on the rear surface and configured to engage with a plurality of contact members of the computing device when the protective cover is connected with the front surface of the computing device, wherein the electrically conductive contact members are configured to provide an indication that the cover is connected with the computing device and also identify a specific cover type based upon a specific pattern of connection between the electrically conductive contact members and corresponding contact members of the computing device so as to facilitate operation by the computing device of specific software applications associated with the cover.

2. The protective cover of claim 1, wherein the sheet is configured to removably connect to the front surface and also the rear surface of the computing device.

3. The protective cover of claim 1, wherein a touch screen area is located on the front surface of the sheet and includes at least one capacitive sensor that is activated by a user when the user presses upon the touch screen area, the at least one capacitive sensor further being in electrical contact with one or more contact members of the protective cover to facilitate user interaction with the computing device when the user presses upon the touch screen area and the protective screen is connected with the computing device.

4. The protective cover of claim 1, wherein the plurality of electrically conductive contact members are disposed proximate one side of the cut-out section and aligned to engage with the corresponding contact members of the computing device when the protective cover is connected with the front surface of the computing device.

5. A product comprising the protective cover of claim 1 and a memory storage device, the memory storage device including at least one application comprising computer readable program instructions to display content on the display of the computing device that is associated with the protective cover.

6. An apparatus comprising:
    a portable computing device, the computing device comprising a front surface and a rear surface, a display disposed on the front surface of the computing device, a plurality of contact members disposed on the front surface of the computing device, a processor, and memory; and
    a protective cover comprising:
        a sheet including a front surface and a rear surface, wherein the sheet has a suitable dimension to cover at least the display of the computing device when the protective cover is connected to the front surface of the computing device, the sheet further including a cut-out section that facilitates viewing of a reduced area of the display when the protective cover is connected with the computing device; and
        a plurality of electrically conductive contact members located on the rear surface of the sheet and configured to engage with corresponding contact members of the computing device when the protective cover is connected with the front surface of the computing device;
    wherein the electrically conductive contact members are configured to provide an indication that the cover is connected with the computing device and also identify a specific cover type based upon a specific pattern of connection between the electrically conductive contact members and the corresponding contact members of the computing device so as to facilitate operation by the computing device of specific software applications associated with the cover.

7. The apparatus of claim 6, wherein the plurality of electrically conductive contact members are disposed proximate one side of the cut-out section and aligned to engage with the corresponding contact members of the computing device when the protective cover is connected with the front surface of the computing device.

8. The apparatus of claim 6, wherein the memory includes at least one application that is associated with the protective cover.

9. The apparatus of claim 6, wherein the processor is further configured to execute and control operations of the at least one application so as to:
 in response to an identification of the protective cover being engaged with the front surface of the computing device, execute and control operations of the at least one application so as to enable the at least one application associated with the protective cover to display content in the reduced area of the display corresponding with the cut-out section of the protective cover.

10. The apparatus of claim 9, wherein the at least one application associated with the protective cover includes user interactive features such that content displayed in the reduced area of the display is controlled by user inputs to the computing device.

11. The apparatus of claim 8, wherein the processor is further configured to execute and control operations of the at least one application so as to identify when the protective cover disengages with the front surface of the computing device.

12. The apparatus of claim 6, wherein the protective cover is configured to removably connect to the front surface and also the rear surface of the computing device.

13. The apparatus of claim 6, wherein a touch screen area is located on the front surface of the sheet and includes at least one capacitive sensor that is activated by a user when the user presses upon the touch screen area, the at least one capacitive sensor further being in electrical contact with one or more contact members of the protective cover to facilitate user interaction with the computing device when the user presses upon the touch screen area and the protective screen is connected with the computing device.

14. A method comprising:
 connecting a protective cover to a front surface of a computing device, wherein the computing device comprises a display disposed on the front surface of the computing device, a plurality of contact members disposed on the front surface of the computing device, a processor, and memory, and the protective cover comprises a sheet including a front surface and a rear surface, wherein the sheet has a suitable dimension to cover at least the display of the computing device when the protective cover is connected to the front surface of the computing device, the sheet further including a cut-out section that facilitates viewing of a reduced area of the display when the protective cover is connected with the computing device, and a plurality of electrically conductive contact members located on the rear surface of the sheet and configured to engage with corresponding contact members of the computing device in response to the protective cover being connected with the front surface of the computing device; and
 identifying, via the computing device, when the protective cover is engaged with the front surface of the computing device based upon sensing a contact between the corresponding contact members of the computing device and the contact members of the protective cover, wherein the electrically conductive contact members are configured to provide an indication that the cover is connected with the computing device and also identify a specific cover type based upon a specific pattern of connection between the electrically conductive contact members and the corresponding contact members of the computing device so as to facilitate operation by the computing device of specific software applications associated with the cover.

15. The method of claim 14, further comprising:
 in response to an identification of the protective cover being engaged with the front surface of the computing device, execute and control operations, via the processor, of at least one application stored within the memory of the computing device so as to display content in the reduced area of the display corresponding with the cut-out section of the protective cover.

16. The method of claim 15, further comprising:
 providing interactive features of the at least one application to control content that is displayed in the reduced area of the display is by user inputs to the computing device.

17. The method of claim 16, wherein the providing interactive features further comprises providing a touch screen area located on the front surface of the sheet and including at least one capacitive sensor that is activated by a user when the user presses upon the touch screen area, and the at least one capacitive sensor is in electrical contact with one or more contact members of the protective cover to facilitate user interaction with the computing device when the user presses upon the touch screen area and the protective screen is connected with the computing device.

18. The method of claim 15, further comprising:
 obtaining the at least one application by downloading the at least one application to the computing device from a memory storage device via a network.

19. The method of claim 14, further comprising:
 identifying, via the computing device, when the protective cover is disconnected with the front surface of the computing device.

20. The method of claim 14, further comprising:
 disconnecting the protective cover from the front surface of the computing device; and
 connecting the protective cover to a rear surface of the computing device.

\* \* \* \* \*